United States Patent [19]

Cartier

[11] 4,429,949

[45] Feb. 7, 1984

[54] CONNECTOR FOR OPTICAL FIBERS WHEREIN INDIVIDUAL FIBER IS CENTERED BY A PLURALITY OF BALLS

[75] Inventor: Jacques Cartier, Fontenay-Sous-Bois, France

[73] Assignee: Radiall, Rosny-Sous-Bois, France

[21] Appl. No.: 185,876

[22] Filed: Sep. 9, 1980

[30] Foreign Application Priority Data

Sep. 18, 1979 [FR] France ............... 79 23200

[51] Int. Cl.³ ................................. G02B 7/26
[52] U.S. Cl. .................. 350/96.21; 350/96.23
[58] Field of Search ............ 350/96.21, 96.23

[56] References Cited

U.S. PATENT DOCUMENTS 4,087,155 5/1978 Deacon ............ 350/96.21
4,208,093 6/1980 Borsuk ........... 350/96.21 X

FOREIGN PATENT DOCUMENTS 2741367 12/1978 Fed. Rep. of Germany ... 350/96.21
2602662 7/1977 Fed. Rep. of Germany ... 350/96.21

OTHER PUBLICATIONS

Hensel, *Triple-Ball Connector for Optical Fibres*, Electronics Letters, vol. 13, No. 24, Nov. 24, 1977, pp. 734, 735.

*Primary Examiner*—Paul L. Gensler
*Attorney, Agent, or Firm*—Brisebois & Kruger

[57] ABSTRACT

An optical fiber connector in which individual optical fibers are precisely centered at their opposed ends, with respect to each other, without the requirement of precise manufacturing tolerances of the connector parts. An individual optical fiber having an elastic sheath is centered within a rigid sleeve by a plurality of balls, which can be metal, circumferentially spaced around the elastic sheath of the optical fiber, and which radially compress the elastic sheath to precisely center the fiber with respect to the rigid sleeve. The balls can be retained in a cage of an optical ferrule against both radial escape and any significant axial displacement relative to the fiber. This arrangement permits connecting and disconnecting the individual fibers from the connector, with a low coupling and uncoupling force since the balls can roll and therefore do not damage either the rigid sleeve or the elastic sheath of a fiber.

8 Claims, 7 Drawing Figures

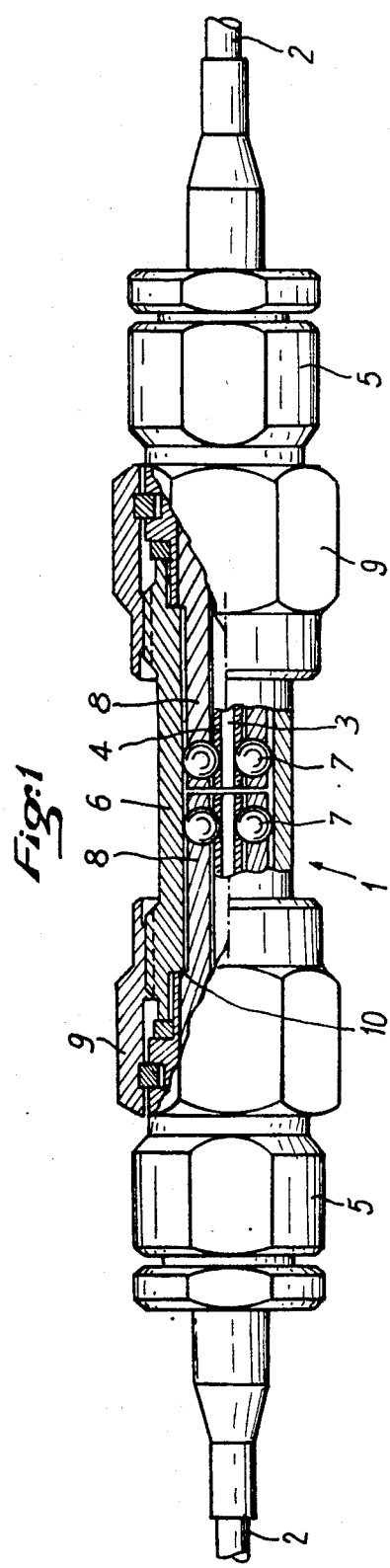
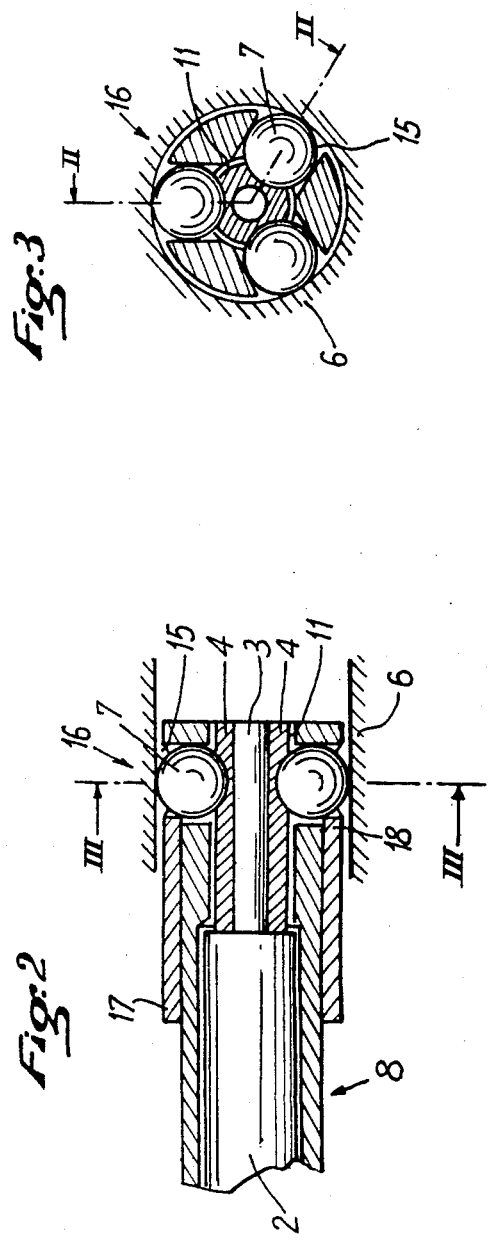

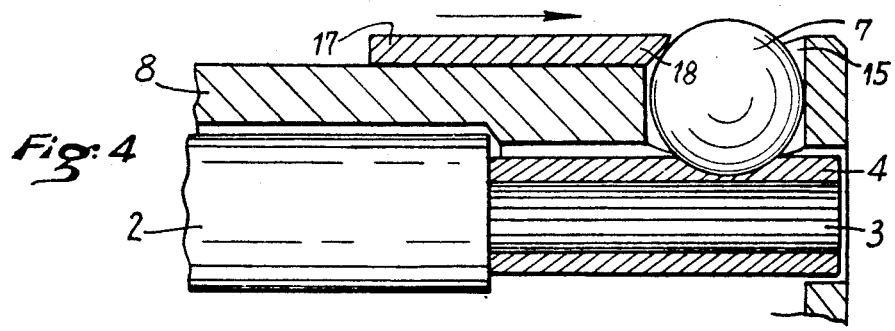
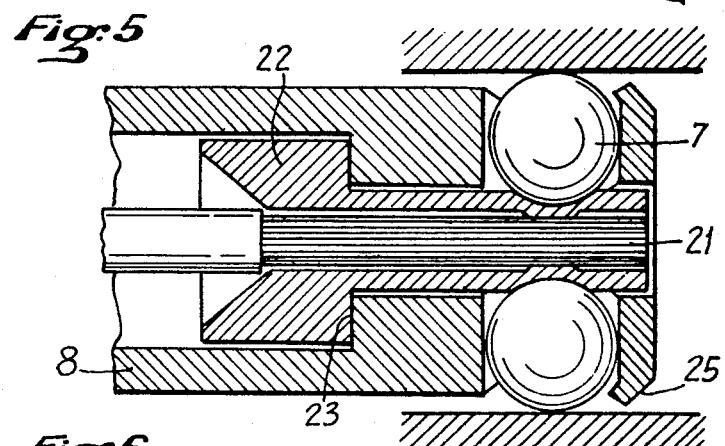
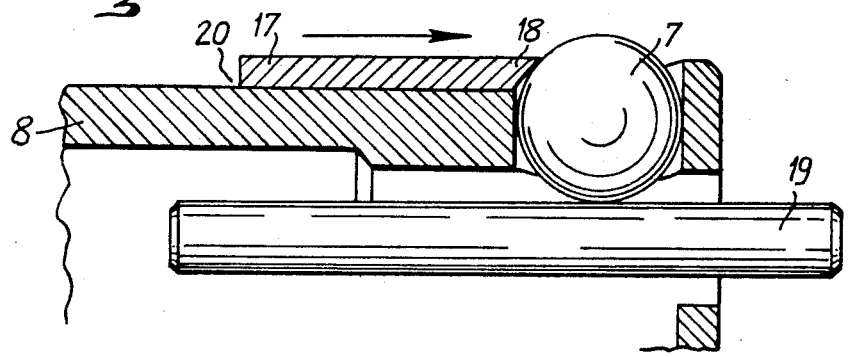
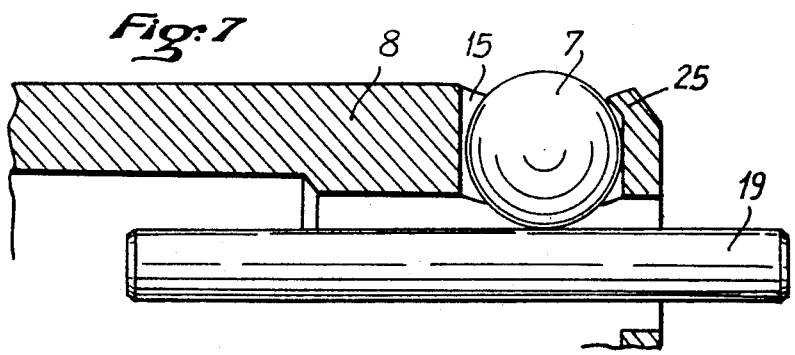

CONNECTOR FOR OPTICAL FIBERS WHEREIN INDIVIDUAL FIBER IS CENTERED BY A PLURALITY OF BALLS

BACKGROUND OF THE INVENTION

The present invention relates to a connector for optic fibers, particularly an optic fiber with an elastic sheathing.

It is known that one of the most difficult problems encountered in putting into operation systems involving optic fibers resides in joining, at their ends, two optic fibers in a connector. In particular, it is necessary in such a connector to assure precise radial centering of the two fibers, one with respect to the other, in order to reduce as much as possible the coupling losses of the optic fibers.

One has already proposed connectors of this type, which all have as their principal disadvantage the fact that they require very close manufacturing tolerances.

SUMMARY OF THE INVENTION

The present invention aims at providing a connector for optic fibers which assures a good alignment of the axes of the fibers while avoiding the need for very close manufacturing tolerances.

For this purpose the present invention has for its object a connector, for optic fibers with elastic sheathing, characterized by the fact that it comprises, in combination, a rigid sleeve and two sets of centering balls placed in the interior of the sleeve, the centers of the balls of each of the sets of balls being placed approximately in the same plane perpendicular to the axis of the sleeve and the planes of each of the sets of balls being spaced axially one from the other, each of the sets of balls defining a central space with dimensions such that one end of an optic fiber can be centered there by radial compression of the elastic sheathing of the fiber.

Thus the compression of the elastic sheathing permits taking up and substantially reducing not only the tolerances of the connector itself whether it be the diameter of the sleeve or the diameter of the balls, but also the tolerances of the diameter of the fiber or the diameter of the elastic sheathing itself. Thus one avoids close manufacturing tolerances.

In addition the use of the connector is particularly easy because at the time of insertion of the fiber, the balls can be separated to a diameter greater than that of the sleeve and can turn.

The optic surface of the fiber can, in addition, be positioned with great precision in the connector because the bearings can be separated during this operation. As a result one can reduce not only the losses of coupling because of the non-centering of the fibers one with respect to the other, but also the losses because of the axial separation between the optic surfaces of the ends of the two coupled fibers.

Finally, also because of the unique rolling of the bearing like balls on the sleeve at the time of the placing of the optic ferrule in the sleeve, there is little wear or abrasion of the balls or of the sleeve, thus preventing metallic particles from contaminating the optic face of the coupled fibers. This arrangement allows as a result an increased number of couplings and uncouplings, without damage, and very low coupling and uncoupling forces.

In one embodiment of the present invention the elastic sheathings is the optic sheathing of the optic fiber.

This could also be the case for example with optic fibers of a known type having a core of silica or of glass covered with an optic sheathing of silicone. In this case the centering is obtained by a local compression of the optic sheathing of silicone between the balls of each of the sets of balls.

As a variation the elastic sheathing could be a sleeve attached on the optic fiber. This embodiment is present in the case where the optic fiber does not include an elastic optic sheathing or also in the case where the core of the optic fiber has been bared.

In one advantageous embodiment of the invention each set of bearing balls is maintained in an optic ferrule forming a cage, engaged in the sleeve, means being provided to axially fix the optic ferrule with respect to the sleeve.

In order to maintain the bearing balls in the optic ferrule before its introduction into the sleeve an annular peripheral retaining flange could be used.

This peripheral annular retaining flange is advantageously made of an axially sliding sleeve at the periphery of the optic ferrule, capable of movement from the area of the optic ferrule where the balls are placed, and to be locked in a position where it retains the ball bearings.

As a variation, the annular retaining peripheral flange is formed by crimping one of the ends of the optic ferrule.

Other characteristics and advantages of the invention will become apparent in the description which follows of several embodiments given by way of non-limiting examples.

DESCRIPTION OF THE DRAWINGS

FIG. 1 is an assembled side view of a connector according to the invention, partially in axial section, FIG. 2 is a partial view in section taken along line II - II of FIG. 3 of another embodiment, FIG. 3 is a view in section taken along the line III - III of FIG. 2, FIG. 4 is a partial enlarged view in section of a portion of FIG. 2, FIG. 5 is an enlarged partial view in axial section of another embodiment of the connector according to the invention, FIG. 6 is a partial view in section of the connector of FIG. 4 showing the gauging of the free interior space between the ball-bearings, and FIG. 7 is an enlarged partial view in section of the connector of FIG. 5, also showing its gauging.

DETAILED DESCRIPTION

FIG. 1 shows a connector 1 according to the invention for coupling individual optic fibers 3 of two optic cables 2.

Each optic cable 2 comprises in a known manner, an external protection sheathing inside of which is placed the optic fiber itself, composed of a core 3 for example of glass or silica covered with an optic sheathing 4 which could, for example, be made of silicone. Each of the cables 2 is held in the body 5 of the connector in a known manner for example by crimping or clamping.

Connector 1 includes essentially a rigid sleeve 6 in the interior of which are placed two sets of balls 7, all of the same size. Each of the sets of balls 7 is retained in a ferrule 8 engaging the interior of the sleeve 6. The ferrules 8 are themselves held solidly, axially, in the sleeve 6 by threaded nuts 9. The nuts 9 have interior threading which, cooperating with the exterior threading on the periphery of the sleeve 6, permits engaging a shoulder 10 of the ferrule 8 against a corresponding shoulder of the sleeve 6 so that the axial position of the end of the optic fiber is determined with precision. As a result the axial distance between the ends of the two optic fibers can also be determined and set with precision.

In other forms of the invention, the optic ferrules 8 can abut against each other.

As is more apparent on FIGS. 2, 3 and 4 which show an embodiment slightly different from that of FIG. 1, each of the sets of balls define a central space 11 which is such that when the balls 7 rest on the internal surface of the sleeve 6, the end of the optic fiber is centered in the free space in the interior, the balls compressing the optical elastic sheathing 4 of the fiber.

The ferrule 8 has here an essentially cylindrical shape. The end of the ferrule is pierced with cavities or bores 15 of a diameter slightly larger than that of the balls to form a cage 16 which allows radial displacement of the balls.

Also provided is a sleeve or band 17 capable of sliding on the ferrule 8. In the position shown on FIGS. 2 and 4 one sees that the sleeve 17 has an annular flange 18 which partially covers the cavities 15 and prevents, as a result, the escape of balls 7 from the cage 16.

When the sleeve 17 is to the contrary withdrawn toward the left side of FIG. 2, the cavities 15 are uncovered so that the balls 7 can be introduced into the cage.

Thus to avoid the loss of the balls 7 during mounting of the optic fiber in the connector, the sleeve 17 is fixed on the ferrule 8 for example by means of a glue, or of a resin, at the time of the manufacture of the connector. This operation, which is shown at FIG. 6, is performed with the aid of a cylindrical template or gauge 19 of a diameter such that when it is in place between the balls 7 there is a central space slightly larger than the space 11 provided for the optic fiber. The balls 7 are placed in the respective cavities 15, the template 19 is placed between the ball bearings, and the sleeve 17 is slid to come to rest on the ball-bearings 7. The sleeve 17 is then glued on the ferrule 8 in zone 20. Thus the flange 18 opposes the outward displacement of the balls 7 from the cage 16, but when the ferrule is introduced into the sleeve 6 the balls rest nevertheless on the internal surface of this sleeve and no longer on the flange 18 which thus assures the centering of the optic fiber by the balls.

During such introduction of the ferrule into the sleeve, the balls are displaced radially toward the interior assuring an automatic centering of the fiber in the free space.

FIG. 5 shows a variant of the connector according to the invention designed to be used with an optic fiber 21 not having an elastic optic sheathing.

In this embodiment an internal elastic sleeve 22 is provided as a substitute for the elastic sheathing 4 in the embodiment described above. The sleeve 22 has a shoulder 23 permitting its axial positioning with respect to the ferrule 8.

FIG. 5 also shows a variation in the means to retain the balls 7. In this embodiment the balls 7 are prevented from leaving the housing 16 radially by means of a flange 25 formed at the external periphery of an annular collarette at the end of the ferrule 8.

FIG. 7 shows the operation of gauging the connector shown at FIG. 5. As before a template or gauge 19, made of a cylindrical rod, is used.

In this case balls 7 are introduced in the cavities 15 and template 19 is placed between the balls 7. Balls 7 are then encased by forming the flange 25, by rolling or otherwise deforming the periphery of the collarette, and template 19 can then be removed.

Of course this setting for balls 7 can be used in a connector for optic fibers having an elastic optic sheathing, just as flange 17 can be used in a connector for optic fibers with a rigid optic sheathing.

FIG. 3 shows a set of balls 7 comprising three balls. This is the minimum number of balls which should comprise a set of balls, but of course a greater number can be used. In particular, good results have also been obtained with sets of four balls.

By way of example, tests have been made with an optic fiber the diameter of whose core was 400 $\mu m \pm 32$ $\mu m$ and whose exterior diameter of the elastic optic sheathing was 550 $\mu m \pm 44$ $\mu m$.

With an internal diameter of sleeve 6 equal to 3.46 mm $\pm 40$ $\mu m$ and a ball diameter equal to 1 mm $\pm 4$ $\mu m$, the misalignment of the axis of the fibers has never been greater than 15 $\mu m$ which results in a loss of 0.45 db.

Consequently it will be noted that the connector according to the invention allows for excellent alignment of two optic fibers and consequently small losses without requiring very close manufacturing tolerances.

This application is related to application in France, No. 79.23200, and the disclosure thereof is incorporated herein by reference.

I claim:

1. A connector for optic fibers with an elastic sheath, comprising in combination, a rigid sleeve having an axis, a first optic fiber having an end within said sleeve, an elastic sheath on said fiber adjacent said end, means for radially centering said fiber relative to said sleeve and comprising, a set of balls between said sleeve and said elastic sheath, said balls each engaging the inside of said sleeve and the outside of said sheath and being disposed near the end of the fiber with their centers in a common plane perpendicular to the axis of said sleeve, said set of balls cooperating with the inside of said sleeve to define a space along the axis of the sleeve which is slightly less than the external diameter of said elastic sheath so that said first optic fiber is centered in said sleeve by means of radial compression of the elastic sheath by said balls, a second optic fiber having an end facing toward the end of the first optic fiber, and means for radially centering the end of the second optic fiber relative to the axis of said sleeve.

2. A connector according to claim 1 wherein, said second fiber has an elastic sheath and is within said sleeve, and said means centering said second fiber relative to said sleeve comprises, a second set of balls between said sleeve and the elastic sheath of said second fiber, said balls of said second set each engaging the inside of said sleeve, and the outside of said sheath of the second fiber, and being disposed near the end of the second fiber with their centers in a common plane perpendicular to the axis of the sleeve and spaced from the plane of the first set of balls, said second set of balls cooperating with said sleeve to radially compress the elastic sheath of the second fiber and center the second fiber relative to the axis of the sleeve.

3. A connector according to claim 1, wherein the elastic sheath comprises the optic sheath of the optic fiber.

4. A connector according to claim 1, wherein the elastic sheath comprises a sleeve attached to the optic fiber.

5. A connector according to claims 1, 2 or 3, wherein each set of balls is held in a cage of an optic ferrule engaged in the sleeve, and means to axially fix each optic ferrule with respect to the sleeve.

6. A connector according to claim 5, wherein each optic ferrule has an annular peripheral ball retaining flange.

7. A connector according to claim 6, wherein the annular peripheral retaining flange comprises an axially sliding bushing on the periphery of the optic ferrule, moveable to a position thereon to retain said balls against radially outward escape from the ferrule, and means to secure said bushing in said ball retaining position.

8. A connector according to claim 6, wherein the annular peripheral ball retaining flange comprises an upset flange at one end of the optic ferrule.

* * * * *